United States Patent
Willems et al.

(10) Patent No.: US 10,789,249 B2
(45) Date of Patent: Sep. 29, 2020

(54) OPTIMAL OFFSET PUSHDOWN FOR MULTIPART SORTING

(71) Applicant: SAP SE, Walldorf (DE)

(72) Inventors: Paul Willems, Heidelberg (DE); Thomas Peh, Heidelberg (DE)

(73) Assignee: SAP SE, Walldorf (DE)

( * ) Notice: Subject to any disclaimer, the term of this patent is extended or adjusted under 35 U.S.C. 154(b) by 609 days.

(21) Appl. No.: 15/603,282

(22) Filed: May 23, 2017

(65) Prior Publication Data

US 2018/0341676 A1 Nov. 29, 2018

(51) Int. Cl.
*G06F 16/2453* (2019.01)
*G06F 16/2455* (2019.01)

(52) U.S. Cl.
CPC .. *G06F 16/24542* (2019.01); *G06F 16/24537* (2019.01); *G06F 16/24554* (2019.01)

(58) Field of Classification Search
None
See application file for complete search history.

(56) References Cited

U.S. PATENT DOCUMENTS

| | | | |
|---|---|---|---|
| 7,783,106 B2 * | 8/2010 | Cooper | G06F 16/7847 382/173 |
| 2012/0078855 A1 * | 3/2012 | Beatty | G06F 11/1451 707/676 |
| 2014/0222787 A1 * | 8/2014 | Xu | G06F 16/278 707/722 |
| 2017/0017692 A1 * | 1/2017 | Das | G06F 16/24539 |
| 2018/0218030 A1 * | 8/2018 | Wong | G06F 16/2425 |

* cited by examiner

*Primary Examiner* — Christopher J Raab
(74) *Attorney, Agent, or Firm* — Mintz Levin Cohn Ferris Glovsky and Popeo, P.C.

(57) ABSTRACT

In some aspects, a method, computer program product, and system are provided for query optimization. In some implementations, there may be provided a method including detecting a select query as a candidate for optimization, the select query including an order by, an offset value, and a limit value; determining, in response to the detecting, a modified offset value as the difference between the offset value and a size of a smaller dataset; and performing the select query to form a result set, the select query executed based on at least the modified offset value. Related systems, methods, and articles of manufacture are also described.

15 Claims, 4 Drawing Sheets

OPTIMAL OFFSET PUSHDOWN FOR MULTIPART SORTING

TECHNICAL FIELD

The subject matter described herein relates to database management and, in particular, query optimization.

BACKGROUND

Database management systems have become an integral part of many computer systems. For example, some systems handle hundreds if not thousands of transactions per second. On the other hand, some systems perform very complex, multidimensional analysis on data. In both cases, the underlying database may need to handle responses to queries very quickly in order to satisfy systems requirements with respect to transaction time. Given the complexity of these queries and/or their volume, the underlying databases face challenges when optimizing performance.

SUMMARY

In some aspects, a method, computer program product, and system are provided. In some implementations, there may be provided a method including detecting a select query as a candidate for optimization, the select query including an order by, an offset value, and a limit value; determining, in response to the detecting, a modified offset value as the difference between the offset value and a size of a smaller dataset; and performing the select query to form a result set, the select query executed based on at least the modified offset value.

In some variations, one or more of the features disclosed herein including the following features can optionally be included in any feasible combination. The select query may be executed on a larger dataset by at least skipping to the determined modified offset in the larger dataset. The smaller dataset may be merged with a remaining portion of the larger dataset to form the result set. The remaining portion may result from at least skipping to the determined modified offset in the larger dataset. The select query may be received from an application. The select query may be received as a candidate for optimization. The result set (which may be determined based at least on the modified offset) may be returned to the application. The smaller dataset may represent a first portion of a database and the larger data set may represent a second portion of a database. The first portion may represent a plurality of rows of the database, and the second portion may represent a plurality of other rows of the database. The order by may specify result ordering. The offset value may specify how many rows to skip. The limit value may specify a maximum quantity of elements for the result set. The executing the select query may further include pushing down to the determined modified offset in the larger dataset.

Implementations of the current subject matter can include systems and methods consistent with the present description, including one or more features as described, as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Suppose a select query is performed over, for example, two horizontal partitions, such as shards or fragments, of a database table, and further suppose the select includes an order by command that sorts the result set in ascending (or descending) order on a given column attribute(s) and the select further includes an offset clause and a limit clause. The offset defines how many rows should be skipped in the sorted dataset, and the limit defines how many rows should be produced, or included, in the result set being returned in response to the select query (e.g., the maximum number of results in the result set). Table 1 below depicts an example of pseudo code consistent with this example.

TABLE 1

SELECT
FROM table_name
ORDER BY column, Ascending, Offset=1000 and limit=2.

To illustrate further, suppose M in this example corresponds to the sorted intermediate result set for the first shard and includes 1050 elements, and N in this example corresponds to the sorted intermediate result set for the second shard and includes 10 elements. This example illustrates that there are two sorted data sets (which in this example is sorted in ascending order in accordance with Table 1). However, to return the final result set, M and N need to be merged as the order of the elements in M relative to those in N is unknown.

Figure 1A:
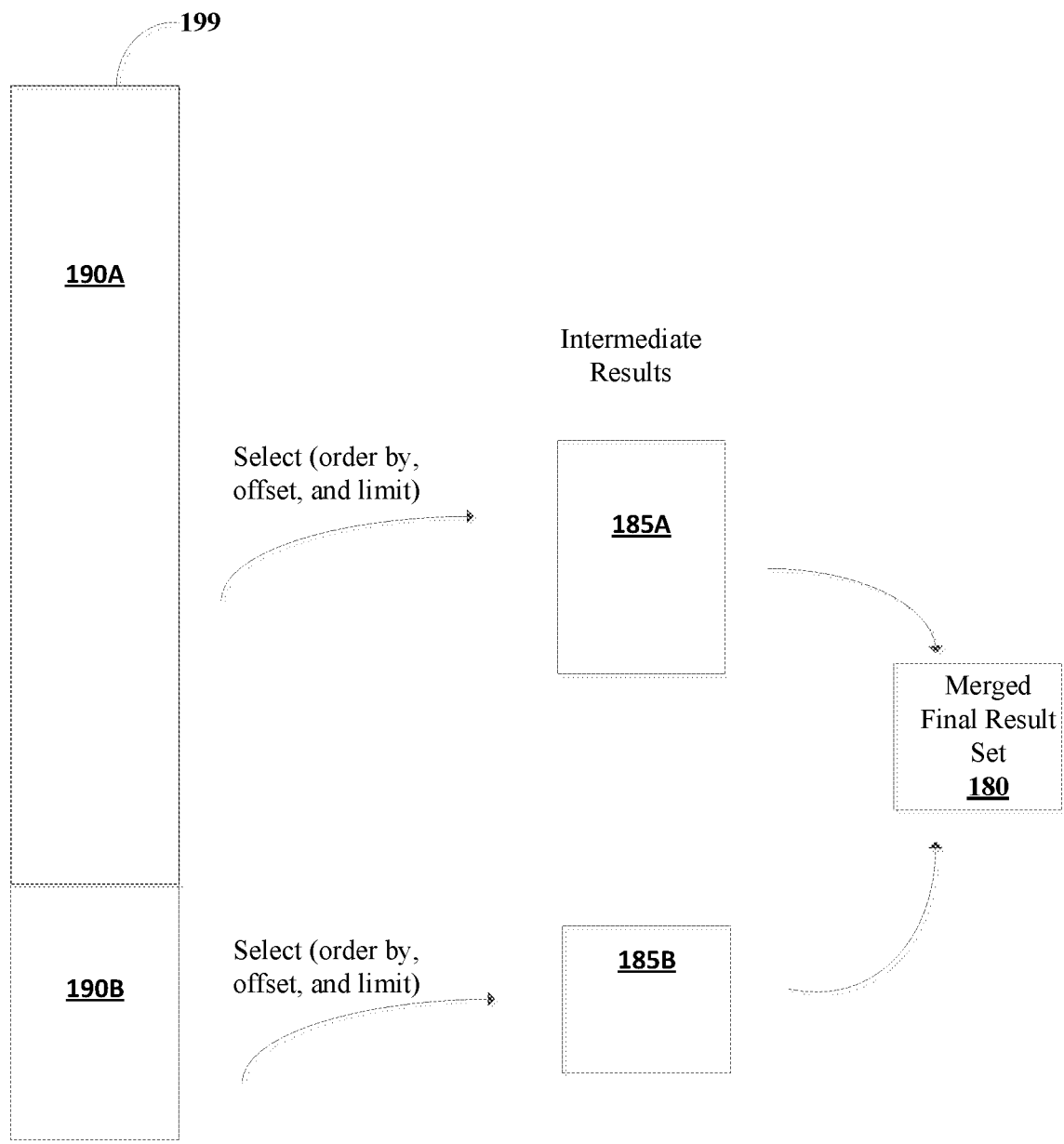
FIG. 1A depicts an example of a portion of a database table being processed, in accordance with some example embodiments.

To illustrate further, FIG. 1A depicts an example of a portion of database table such as column 199. In the example, two horizontal partitions, such as shards 190A and 190B, may be processed separately to provide faster processing via parallelism, for example. In this example, the select (which includes an order by attribute, offset, and limit as shown at Table 1 above) may be applied separately to the shards 190A and 190B. However, the intermediate result sets M 185A and N 185B must be merged, in the proper order, to provide the final result set 180.

One way to handle the select query (which has the order by ascending, offset, and limit as shown in Table 1, for example) is to get the offset plus limit of the smallest elements of M (which returns 1002 elements), get the offset plus limit of the smallest elements of N (which returns 10 elements), merge both results, drop the offset, smallest elements from the resulting merged result, and then apply the limit. However, this would require, in this example, a comparison of up to 1012 elements to merge N into M. This merging can be very costly from a computational processing and memory perspective. Furthermore, this approach may request an initial retrieve of 1002 elements from M, which can also be costly.

In some example embodiments, a modified offset may be determined before executing the query on the larger dataset, and this modified offset may be used as the offset in the select query including an order by, offset, and limit as shown in Table 1, for example. The modified offset may be passed (or "pushed down") to that query for more efficient runtime or execution.

Referring to the previous example, the smaller of the two datasets, such as N, may be selected. In this example, there are 10 sorted data elements in N. However, now a modified offset may be applied to the larger dataset M (or the query which produces it). This modified offset is equal to the original offset minus the size of the first, smaller dataset N:

$$\text{Modified offset}=\text{MAX}(0;\text{original offset}-N) \quad \text{Equation 1.}$$

Referring again to the ongoing example, the modified offset is equal to 990 (which is the original offset of 1000 minus the size of the smaller dataset N of 10). In this example, regardless of how the elements of M and N are combined in the final, ordered result set, the smallest 990 elements of M cannot be in the final result set (as N only has 10 elements and the skipping of the 1000 elements of the merged result of M and N). As such, the first 990 data elements of M can be skipped early. If M is produced by a separate query procedure, this offset of 990 can be pushed down to that separate query routine for runtime or execution, which may exploit the modified offset to produce fewer intermediate results (which may be obtained faster and with less processing and memory burden). Here, the comparisons of N to M to merge the datasets into the final result set may include only 22 comparisons, for example. Specifically, the elements of the dataset N are compared with the elements 990 to 1002 (which is the original offset of 1000 plus the original limit of 2) of the M dataset. This reduction can save a considerable amount of processing and/or memory resources.

Figure 1B:
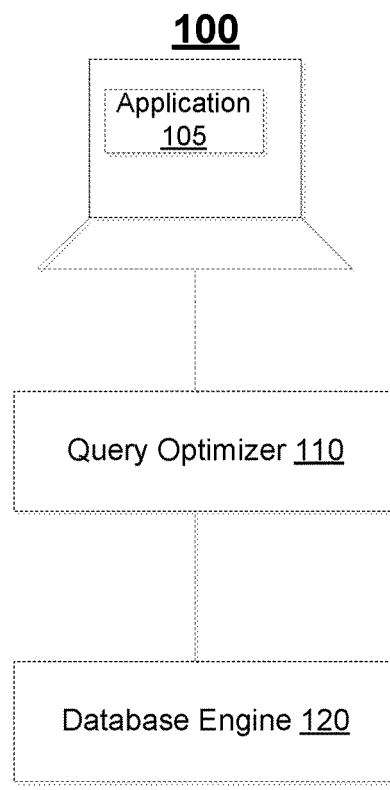
FIG. 1B depicts a block diagram of a system for query optimization, in accordance with some example implementations.

FIG. 1B depicts an example of a system 100, in accordance with some example embodiments. The system 100 may include an application 105 that generates queries for a database engine 120. The database engine 120 may be configured to include, or be coupled to, a database, such as a column store database, a row store database, a multidimensional database, a relational database, and/or the like. In some example embodiments, the query optimizer 110 may be configured to modify runtime of a select query including order by, offset, and limit commands to optimize runtime. Specifically, the query optimizer 110 may be configured to determine a modified offset based on the original offset and the size of the smaller query, such as N.

Figure 2:
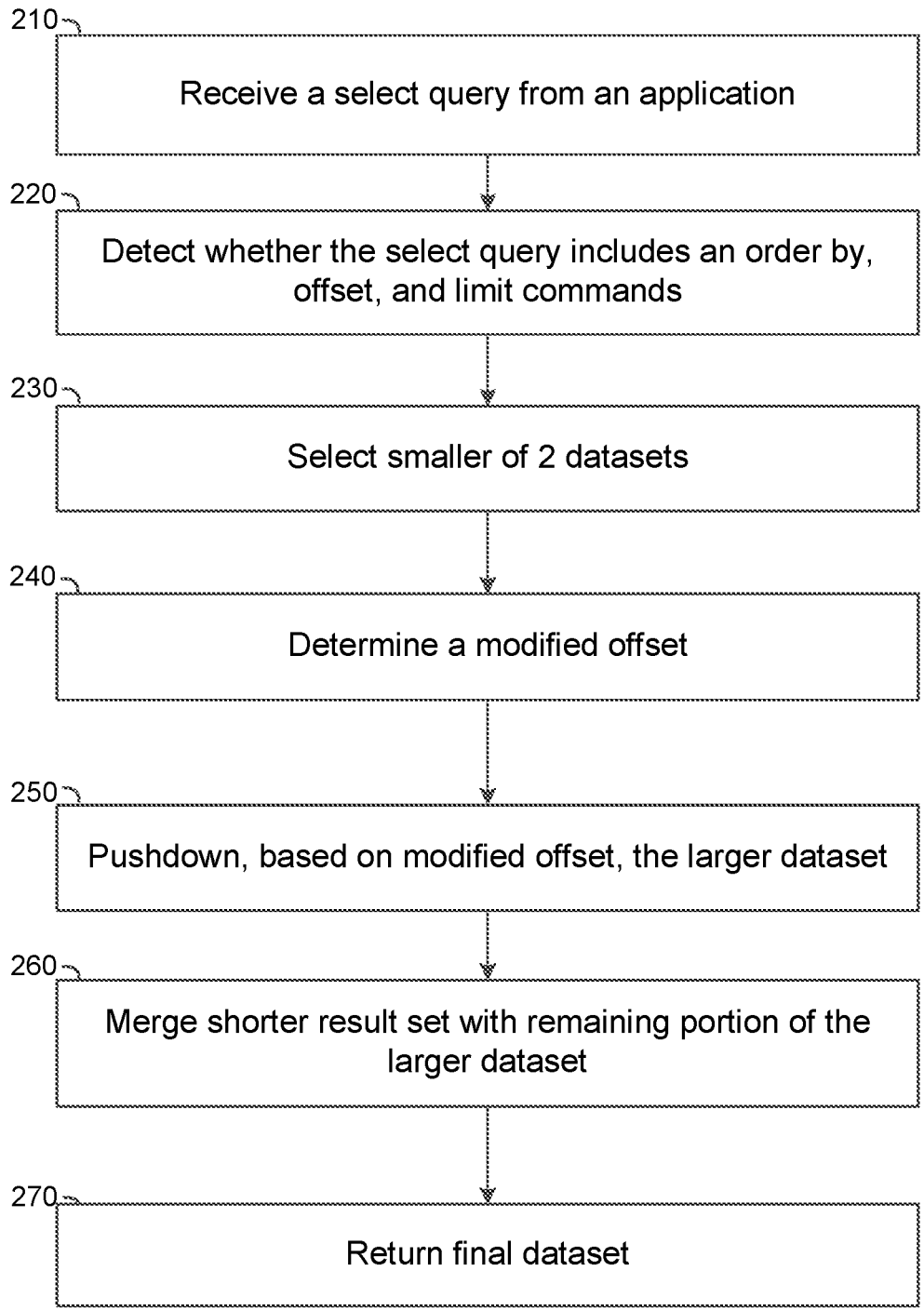
FIG. 2 depicts an example of a process for query optimization, in accordance with some example implementations.

FIG. 2 depicts an example of a process 200, in accordance with some example embodiments.

At 210-220, the query optimizer 110 may receive a select query from application 105, and may then determine whether the select query includes order by, offset, and limit commands. For example, if a select query includes the order by, offset, and limit, then the select query is a candidate for optimization by the query optimizer. To illustrate further, the select query may have the form shown in Table 1 above. At 230, the query optimizer 110 may select a smaller of the two datasets. Referring to the example above, the query optimizer may select the smaller N dataset (which has 10 elements) rather than the larger M dataset (which has 1050 elements). Here, the smaller dataset, N, is selected, and the offset or limit is not applied to the smaller, N dataset. The selected dataset may then be processed by the select query having order by ascending and a offset and limit as shown in Table 1, for example.

At 240, the query optimizer 110 may determine a modified offset for the larger dataset. For example, the modified offset may be determined, based on Equation 1, as the original offset minus the size of the selected, smaller dataset. Referring to the example above, the modified offset is 990 (1000−10).

At 250, the query optimizer 110 may execute the select query using the determined modified offset. For example, the query optimizer 110 may pushdown the select query using the determined modified offset on the larger dataset. For example, the query optimizer 110 may push down on the stack including larger, dataset M to the modified offset of 990, skipping thus to the $990^{th}$ element of the M dataset), so the order by for column M has the following form: ORDER BY M, Ascending, Modified Offset=990 and limit=2.

At 260, the query optimizer 110 may merge the shorter result set with the pushed down larger result set. For example, the query optimizer 110 may merge the shorter result set N with the pushed down larger result set M to determine the final, sorted result set. This merge may compare the 10 elements of the shorter dataset N with the $990^{th}$ element through $1002^{nd}$ element of the larger dataset M (for example, in order to determine where the elements of the N dataset should be merged in the sequence of dataset M). The $1002^{nd}$ element of the larger dataset M represents the original offset of 1000 plus the limit of 2.

After the merge, the query optimizer 110 may return, at 270, the final result set to the application 105. This final result set includes, in this example, two elements, as the limit in this example is two.

Although process 200 refers to two datasets, wherein one has a larger quantity of elements than the other, the two datasets may be of any size including equal size as well. Moreover, the process may be applied to more than two data sets as well. In the case of more than two datasets, the process 200 may be applied repeatedly or recursively. Although the example of Table 1 refers to a column, the optimization described herein may be performed for other portions of a database as well as for other types of datasets in which a merging of the datasets is performed. Furthermore, the example select at Table 1 is merely for illustrative purposes as the select may for example perform an order by over more than one column or the sort may be descending.

Figure 3:
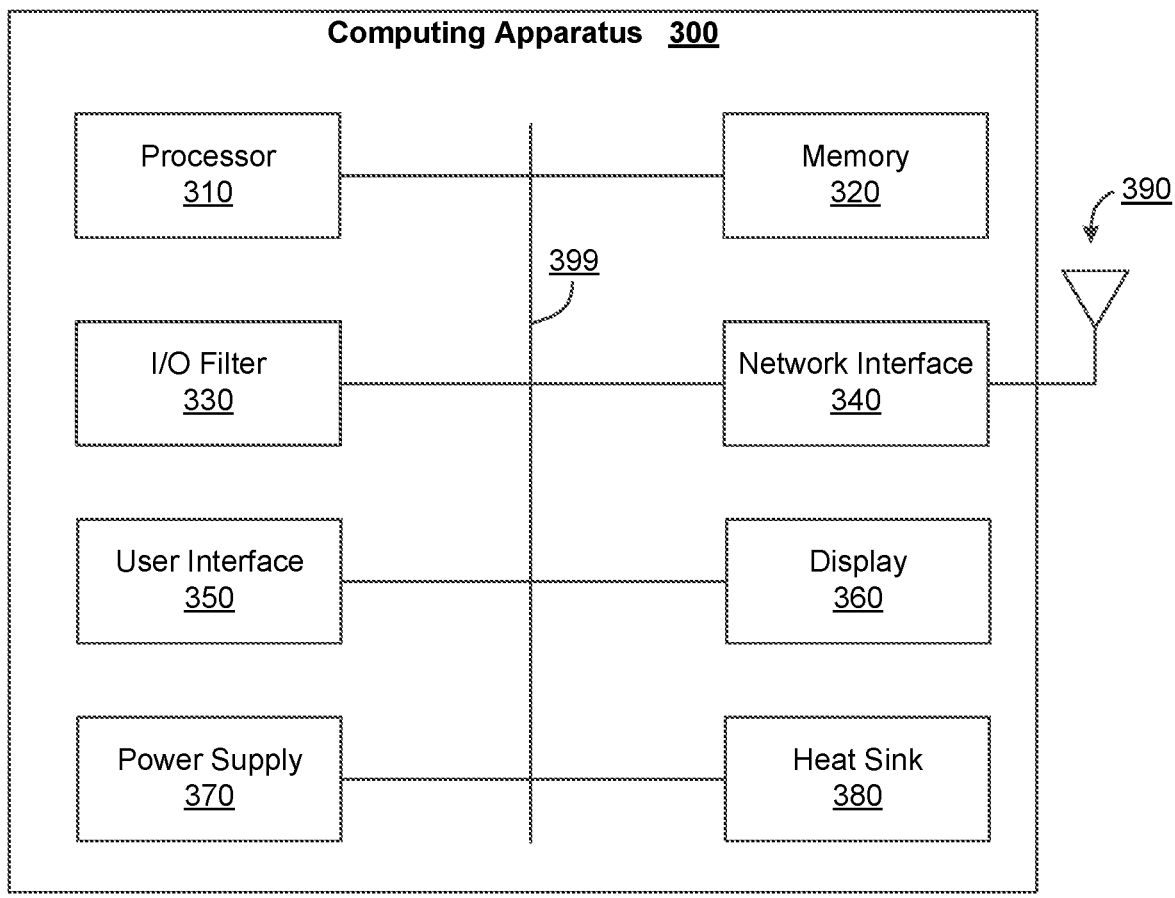
FIG. 3 depicts a block diagram of an example computing apparatus, in accordance with some example implementations When practical, similar reference numbers denote similar structures, features, or elements.

FIG. 3 illustrates an example computing apparatus 300, which may be used to implement one or more of the described devices and/or components, in accordance with some example implementations. Similarly, the computing apparatus 300 may perform one or more of the processes described herein. In some aspects, at least a portion of the computing apparatus 300 can form at least a portion of a client user equipment hosting application 105. Alternatively or additionally, computing apparatus 300 may host the query optimizer 110 and/or the database execution engine 120.

As illustrated, computing apparatus 300 may include one or more processors such as processor 310 to execute instructions that may implement operations consistent with those described herein. Apparatus 300 may include memory 320 to store executable instructions and/or information. Memory 320 may include solid-state memory, solid-state disk drives, magnetic disk drives, or any other information storage device. Apparatus 300 may include one or more network interfaces, such as network interface 340, which can be configured to communicate over wired networks and/or wireless networks. Wireless networks may include WiFi, WiMax, Bluetooth, and cellular networks (2G/3G/4G/5G), and/or any other wireless network. In order to effectuate wireless communications, the network interface 340, for example, may utilize one or more antennas, such as antenna 390.

Apparatus 300 may include one or more user interface, such as user interface 350. The user interface 350 can include hardware or software interfaces, such as a keyboard, mouse, or other interface, some of which may include a touchscreen integrated with a display 360. In various implementations, the user interface 350 can include one or more peripheral devices and/or the user interface 350 may be configured to communicate with these peripheral devices.

The apparatus 300 may also comprise an input and output filter 330, which can filter information received from and/or transmitted to a user interface 350, a network interface 340, and/or the like. The apparatus 300 may be powered through the use of one or more power sources, such as power source 370. One or more of the components of the apparatus 300 may be cooled off through the use of one or more heat sinks, such as heat sink 380. As illustrated, one or more of the components of the apparatus 300 may communicate and/or receive power through a system bus 399.

In some implementations, the computing apparatus 300 can be used to implement at least a portion of a database management system. In some aspects, a database management system may be a hardware and/or software system for receiving, handling, optimizing, and/or executing database queries. In some aspects, a database, as referred to herein, can be a structured, organized collection of data, such as schemas, tables, queries, reports, views, and/or the like, which may be processed for information. A database may be physically stored in a hardware server or across a plurality of hardware servers. In some aspects, a database management system may be a hardware and/or software system that interacts with a database, users, and/or other software applications for defining, creating, updating the structured data, and/or for receiving, handling, optimizing, and/or executing database queries.

For example, the computing apparatus 300 can provide one or more features of a high-level programming software system or other software that includes database management features. The computing apparatus 300 can also aggregate or otherwise provide a gateway via which users can access functionality provided by one or more external software components. One or more client machines can access the computing apparatus 300, either via a direct connection, a local terminal, or over a network (e.g. a local area network, a wide area network, a wireless network, the Internet, or the like).

The computing apparatus 300 can be configured to access a database that includes at least one table, which can in turn include at least one column. The database table can store any kind of data, potentially including but not limited to definitions of scenarios, processes, and one or more configurations as well as transactional data, metadata, master data, etc. relating to instances or definitions of the scenarios, processes, and one or more configurations, and/or concrete instances of structured data, such as objects that are relevant to a specific instance of a scenario or a process, and the like. The database can be external to the computing apparatus 300 or may be part of the computing apparatus 300 (e.g., at least partially stored in the memory 320). In some aspects, the memory 320 may be utilized to store at least a portion of a database and/or function as an in-memory database.

For example, a processor 310, a network interface 340, and/or a user interface 350 may be configured to receive and/or load a database table or other comparable data set, into the memory 320 (e.g., in response to receipt of a query instantiated by a user or computer system through one or more client machines, external software components, core software platforms, and/or the like).

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in any high-level programming language (e.g., following procedural and/or object-oriented programming language paradigms), and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations may be within the scope of the following claims.

The illustrated methods are exemplary only. Although the methods are illustrated as having a specific operational flow, the order of the operations may be altered, two or more operations may be combined into a single operation, a single operation may be performed in two or more separate operations, one or more of the illustrated operations may not be present in various implementations, and/or additional operations which are not illustrated may be part of the methods.

What is claimed is:

1. A method comprising:
   detecting a select query as a candidate for optimization, the select query including an order by, an offset value, and a limit value, the select query being applied to at least two datasets comprising a smaller dataset and a larger dataset, the select query being performed on the at least two datasets to enable at least a portion of the select query processing to be performed in parallel;
   determining, in response to the detecting of the select query, a modified offset value as the difference between the offset value and a size of the smaller dataset;
   executing the select query on the smaller dataset to form a first result set and on the larger dataset to form a second result set, the select query on the larger dataset executed based on the determined modified offset by at least skipping to the determined modified offset in the larger dataset to provide the second result set; and
   merging the first result set from the smaller dataset with the second result set to form a result set for the select query.

2. The method of claim 1 further comprising:
   receiving, from an application, the select query as the candidate for optimization.

3. The method of claim 2 further comprising:
   returning, to the application, the result set determined based at least on the modified offset.

4. The method of claim 1, wherein the smaller dataset represents a first portion of a database and the larger data set represents a second portion of a database.

5. The method of claim 4, wherein the first portion represents a plurality of rows of the database, and the second portion represents a plurality of other rows of the database.

6. The method of claim 1, wherein the order by specifies result ordering, the offset value specifies how many rows to be skipped, and the limit value specifies a maximum quantity of elements for the result set.

7. The method of claim 1, wherein the executing the select query further comprises pushing down to the determined modified offset in the larger dataset, and wherein the determining is performed in response to the detecting the larger dataset and the smaller dataset.

8. A system comprising:
   at least one processor; and
   at least one memory including program code which when executed causes operations comprising:
   detecting a select query as a candidate for optimization, the select query including an order by, an offset value, and a limit value, the select query being applied to at least two datasets comprising a smaller dataset and a larger dataset, the select query being performed on the at least two datasets to enable at least a portion of the select query processing to be performed in parallel;
   determining, in response to the detecting of the select query, a modified offset value as the difference between the offset value and a size of the smaller dataset;
   executing the select query on the smaller dataset to form a first result set and on the larger dataset to form a second result set, the select query on the larger dataset executed based on the determined modified offset by at least skipping to the determined modified offset in the larger dataset to provide the second result set; and
   merging the first result set from the smaller dataset with the second result set to form a result set for the select query.

9. The system of claim 8 further comprising:
receiving, from an application, the select query as the candidate for optimization.

10. The system of claim 9 further comprising:
returning, to the application, the result set determined based at least on the modified offset.

11. The system of claim 8, wherein the smaller dataset represents a first portion of a database and the larger data set represents a second portion of a database.

12. The system of claim 11, wherein the first portion represents a plurality of rows of the database, and the second portion represents a plurality of other rows of the database.

13. The system of claim 8, wherein the order by specifies result ordering, the offset value specifies how many rows to be skipped, and the limit value specifies a maximum quantity of elements for the result set.

14. The system of claim 8, wherein the executing the select query further comprises pushing down to the determined modified offset in the larger dataset, and wherein the determining is performed in response to the detecting the larger dataset and the smaller dataset.

15. A non-transitory computer-readable storage medium including program code which when executed by at least one processor causes operations comprising:
detecting a select query as a candidate for optimization, the select query including an order by, an offset value, and a limit value, the select query being applied to at least two datasets comprising a smaller dataset and a larger dataset, the select query being performed on the at least two datasets to enable at least a portion of the select query processing to be performed in parallel;
determining, in response to the detecting of the select query, a modified offset value as the difference between the offset value and a size of the smaller dataset;
executing the select query on the smaller dataset to form a first result set and on the larger dataset to form a second result set, the select query on the larger dataset executed based on the determined modified offset by at least skipping to the determined modified offset in the larger dataset to provide the second result set; and
merging the first result set from the smaller dataset with the second result set to form a result set for the select query.

* * * * *